US005392865A

United States Patent [19]

Piras

[11] Patent Number: 5,392,865

[45] Date of Patent: Feb. 28, 1995

[54] HYDRAULIC PERCUSSION APPARATUS

[75] Inventor: Bernard Piras, Charly, France

[73] Assignee: Etablissements Montabert, Saint-Priest, France

[21] Appl. No.: 889,189

[22] Filed: May 28, 1992

[30] Foreign Application Priority Data

May 30, 1991 [FR] France ............................... 91 06693

[51] Int. Cl.[6] .............................................. B23Q 5/00

[52] U.S. Cl. ...................................... 173/17; 173/137; 173/138; 173/207; 173/208; 173/204; 91/290; 91/303

[58] Field of Search ................. 173/17, 207, 208, 135, 173/137, 138, DIG. 4, 113, 204; 91/276, 281, 290, 303

[56] References Cited

U.S. PATENT DOCUMENTS

| | | | |
|---|---|---|---|
| 3,830,463 | 8/1974 | Klessig . | |
| 3,887,019 | 6/1975 | Reynolds et al. | 173/DIG. 4 |
| 3,965,799 | 6/1976 | Juvonen et al. | 91/276 |
| 4,474,248 | 10/1984 | Musso | 173/208 |
| 4,635,531 | 1/1987 | Rode | 91/303 |
| 4,800,797 | 1/1989 | Comarmond . | |

FOREIGN PATENT DOCUMENTS

| | | | |
|---|---|---|---|
| 0085279 | 8/1983 | European Pat. Off. . |
| 0256955 | 2/1988 | European Pat. Off. . |
| 1110622 | 4/1968 | United Kingdom . |
| 2141657 | 1/1985 | United Kingdom . |

*Primary Examiner*—Eugenia Jones
*Assistant Examiner*—Allan M. Schrock
*Attorney, Agent, or Firm*—Oliff & Berridge

[57] ABSTRACT

Apparatus comprising a striking piston driven hydraulically in a reciprocating fashion by an incompressible fluid inside a cylinder and striking against a tool, of the type in which the piston slides in a cylinder having two concentric piston bearing surfaces of different sections, of which that situated on the tool side has a section smaller than that remote from the tool, the piston and the cylinder delimiting two antagonistic chambers, an annular bottom chamber and a top chamber of larger section.

According to the invention the interior of the top chamber is permanently at a regulated pressure of a value intermediate between the inlet or high pressure and the outlet or low pressure, and the annular bottom chamber is connected alternately by a distributor to the high pressure supply circuit during the upward phase of the piston and to the top chamber during the accelerated downward phase of the piston.

11 Claims, 13 Drawing Sheets

HYDRAULIC PERCUSSION APPARATUS

BACKGROUND OF THE INVENTION

The subject of the present invention is a hydraulic percussion apparatus, more particularly a hydraulic hammer of simple design which is intended to be easily fitted to various carrier appliances possessing energy sources of different powers.

Taking into account its multipurpose character, a hammer of this kind must be able to operate over a wide range of inlet flows while retaining an efficiency higher than 0.5, efficiency being the ratio between the power supplied to the tool and the input power. This apparatus must operate independently of the return pressure value, which, depending on the carrier appliances, may vary within large proportions.

Finally, this apparatus must generate a weak recoil force during the striking stroke of the piston in order to limit the vibrations transmitted to the carrier equipment, while supplying a constant energy and a high striking frequency in order to ensure good production.

As an example, a hydraulic hammer capable of being fitted to an appliance of 0.8 to 3 tonnes must be able to have the following characteristics:

- inlet flow of hydraulic fluid: from 20 to 45 liters per minute.
- return line pressure:
  - from 0 to 30 bars (1 bar$=10^5$ Pa).
- recoil force less than 700 daN.
- energy per blow: 180 joules.
- striking frequency from 600 to 1500 blows per minute.
- diameter of the tool of the order of 45 mm with a minimum diameter of the striking piston of 40 mm.

These different parameters are interconnected.

The choice of the striking frequency in dependence on the inlet flow determines in fact the amount of oil under pressure available for an operating cycle, the permissible recoil force determines the maximum pressure that can be applied to the driving section of the striking piston, and the energy per stroke, which is equal to the kinetic energy stored by the piston at the moment of the impact, determines the striking stroke of the piston.

The stress in the steel of the striking piston and of the tool is in fact proportional to the speed of impact of the piston. Since the permissible fatigue stress is known, and since the force applied to the driving section and the kinetic energy are defined, it is easy to calculate the striking stroke required, it being specified that this stroke must be sufficient to achieve the different switchings needed for the distribution to function.

Finally, the amount of oil under pressure available for a cycle must serve not only for the accelerated stroke of the striking piston, but also for the return stroke of said piston, since the distribution of this amount of oil substantially influences the total efficiency of the apparatus.

DESCRIPTION OF THE PRIOR ART

A simple solution consists in making a striking piston which is mounted slidably in a cylinder having two bearing surfaces and which, together with said cylinder, defines only two separate chambers, a top chamber having a large section and an antagonistic annular chamber having a small section. A known hydraulic operating system consists in constantly feeding the annular chamber witch pressurized fluid and alternately connecting the top chamber to the source of pressurized fluid and then to a low pressure, in order that the resultant of the forces applied to the piston will be directed alternately in one direction and then in another.

If it should be desired to apply this hydraulic operating system to an apparatus having the characteristics defined above, the following values are obtained:

- driving pressure: 56 bars,
- the input pressure necessary being 56 bars and the maximum pressure of the return circuit being 30 bars, it is possible to calculate the minimum diameter of the large section of the striking piston, which works out at 59 mm,
- the kinetic energy of the striking piston being equal to the hydraulic energy supplied during the accelerated stroke, it is possible to calculate the stroke of the striking piston and the amount of oil needed per blow, which is 70 $cm^3$,
- the predetermined striking frequency makes it possible to calculate the required inlet flow: 105 liters per minute.

Now, the calculated required inlet flow is more than twice the flow available. In addition, the energy necessary for the return stroke of the piston is greater than that supplied during the accelerated striking stroke, and this leads to a total efficiency much lower than 0.5.

In order to obviate these disadvantages, makers of percussion apparatus have sought to utilize driving sections having a small area and subjected to a high driving pressure. It is thus possible to reduce the amount of oil required for a cycle, while retaining the energy per blow without affecting the recoil force and the total efficiency. However, this configuration makes it necessary to produce striking pistons sliding in cylinders having at least three bearing surfaces, in order to create an annular driving section. The simplicity aimed at both in respect of the structure and in respect of the hydraulic drive is then no longer achieved.

The present invention seeks to obviate these disadvantages.

SUMMARY OF THE INVENTION

To this end the percussion apparatus to which it relates, comprising a striking piston driven hydraulically in a reciprocating fashion by an incompressible fluid inside a cylinder and striking against a tool, of the type in which the piston slides in a cylinder having two concentric piston bearing surfaces of different sections, of which that situated on the tool side has a section smaller than that remote from the tool, the piston and the cylinder delimiting two antagonistic chambers, an annular bottom chamber and a top chamber of larger section, is defined in that:

- the interior of the top chamber is at a regulated pressure of a value intermediate between the inlet or high pressure and the outlet or low pressure,
- the annular bottom chamber is alternately connected by a distributor to the high-pressure supply circuit during the upward phase of the piston and to the top chamber during the accelerated downward phase of the piston.

It is thus possible to have a weak recoil force, because the driving pressure is low, to accept a slight inlet flow because the amount of oil under inlet pressure per cycle serves to feed an annular section having a small area, to have a long striking stroke which makes it possible to increase the sealing lengths, to obtain a total efficiency higher than 0.5, and to achieve operation independent of the pressure of the return circuit because neither chamber is subjected to this pressure in the course of the cycle.

In one form of construction of this apparatus the intermediate pressure regulation means consist on the one hand of an energy accumulator and on the other hand of a pressure regulator comprising a cylinder inside which is mounted a piston forming a slide valve of which one end delimits a chamber connected continuously or discontinuously to the high pressure, and of which the other end is situated in a chamber connected continuously or discontinuously to the intermediate pressure and containing a spring tending to displace the slide valve towards its other end, the chamber connected to the intermediate pressure being in communication via a constriction situated on the fluid circulation with a median chamber which is connected to the low pressure return circuit and is obtained by a reduction of the section of the slide valve.

According to one possibility, the pressure regulator chamber which is connected to the high pressure is in communication with an annular chamber formed in the cylinder in which the striking piston moves, said annular chamber being permanently connected to the source of high pressure fluid.

According to another possibility, the pressure regulator chamber which can be connected to the high pressure is in communication with the bottom annular chamber, which in turn is connected to the high pressure during the upward phase of the piston.

According to another characteristic of the invention, the movement of the striking piston is controlled by a hydraulic distributor mounted slidably in a cylinder, with which it delimits four separate chambers, that is to say two chambers situated at the two ends of the distributor, which are connected by a wide channel and are in permanent communication with the intermediate pressure circuit, a first annular chamber continuously connected to the high pressure circuit and a second annular chamber which is antagonistic to said first annular chamber and whose operative section is larger than that of the latter and which is connected alternately to the high pressure circuit and to the intermediate pressure circuit in dependence on the position of the striking piston.

The distributor is advantageously annular and comprises a wide central channel bringing into communication the antagonistic chambers disposed at its ends, and the distributor is disposed coaxially to the striking piston, in the same cylinder as the latter, and above said piston.

BRIEF DESCRIPTION OF THE DRAWINGS

In any case, the invention will be well understood with the aid of the following description, given with reference to the accompanying schematic drawings showing various forms of construction of said apparatus by way of non-limitative examples.

DESCRIPTION OF THE PREFERRED EMBODIMENTS

Figure 1:
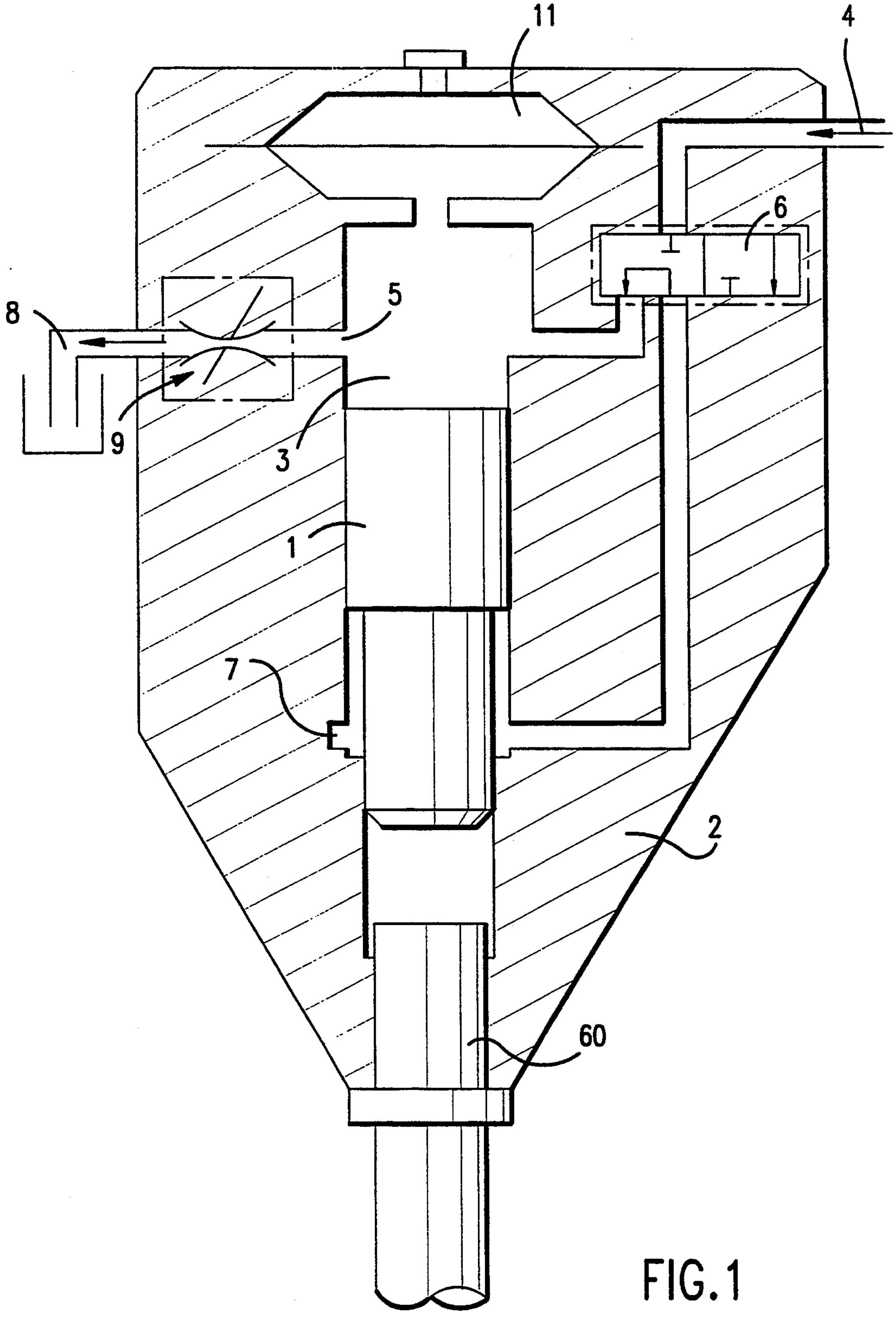
FIG. 1 is a very schematic basic view of the apparatus according to the invention.

FIGS. 1 to 13 illustrate various forms of construction of a percussion apparatus functioning according to the same principle and comprising a piston 1 sliding in a body 2. Together with its cylinder the piston 1 delimits a driving chamber 3, situated above the piston 1, .and an annular chamber 7 which is antagonistic to the chamber 3 and whose section has a small area. The reciprocating movement of the piston is obtained through the communication of the chamber 7 alternately with a high pressure supply circuit 4 and with the driving chamber 3, in such a manner that the resultant of the hydraulic forces is applied successively in one direction and in the other. The chamber 7 is brought alternately into communication with the high pressure and the medium or intermediate pressure by means of a distributor 6, with the aid of hydraulic means described below.

In all the forms of construction the striking piston 1 is given a downward movement when the chamber 7 is connected to the driving chamber 3, and an upward movement when the chamber 7 is connected to the high pressure circuit.

The areas of the sections of the chambers 3 and 7 are so selected that in the course of the upward phase of the piston 1 the medium pressure created in the chamber 3 will be at least slightly higher than the maximum pressure of the return line 8.

The medium pressure is an internal pressure created by the circulation of the amount of oil to be discharged per cycle from the chamber 7 through a medium pressure regulator 9.

In practice the amount of high pressure oil used to fill the chamber 7 during the upward movement of the piston is then discharged to the medium pressure driving chamber 3 during the downward movement of the piston, and then finally discharged to the return circuit 8 by way of the pressure regulator 9. The latter maintains the medium pressure at the predetermined value.

A hydropneumatic accumulator 11, whose volume is in keeping with the amount of oil under medium pressure necessary for the downward movement of the piston 1, is continuously connected to the medium pressure circuit 3, 5, 12. Its purpose is to store the energy during the upward movement of the striking piston 1 and to give it up in order to bring about the accelerated downward movement of the piston 1.

In the form of construction illustrated in FIG. 1 the function of the distributor 6 is shown schematically; depending on its position, either the chamber 7 is connected to the medium pressure circuit 3, 5 and the high pressure circuit 4 is isolated, the resultant of the forces applied to the striking piston being such that the latter moves downwards, or the chamber 7 is connected to the high pressure circuit 4 and isolated from the medium pressure circuit 3, 5, the resultant of the forces applied to the striking piston then being such that the latter moves upwards again.

In the forms of construction illustrated in FIGS. 2 to 12 the distributor 6 is annular and disposed in the working cylinder coaxially to the striking piston 1 and above the latter, so as to delimit, together with the working cylinder, four chambers 3, 12, 13, 14.

The chamber 3 and the chamber 12 are connected together by a wide channel 15 provided in the body of the distributor 6 and are continuously subjected to the medium pressure. The annular chamber 13 is continuously connected to the high pressure circuit 4 by means of a channel 16. Finally, the chamber 14, whose area of the section 17 is greater than that of the chamber 13, is called the control chamber and is antagonistic to the chambers 12 and 13.

This control chamber 14 is alternately subjected to the high pressure and then to the medium pressure in dependence on the position of the striking piston 1, in such a manner that the resultant of the forces applied to the distributor will in succession act in one direction and then in the other. In order to ensure regularity of the cycles, the distribution system is equipped with hydraulic means which make the distributor "bistable". This function is performed by known means such as calibrated orifices provided in the bodies of the distributor and of the apparatus.

Figure 4:
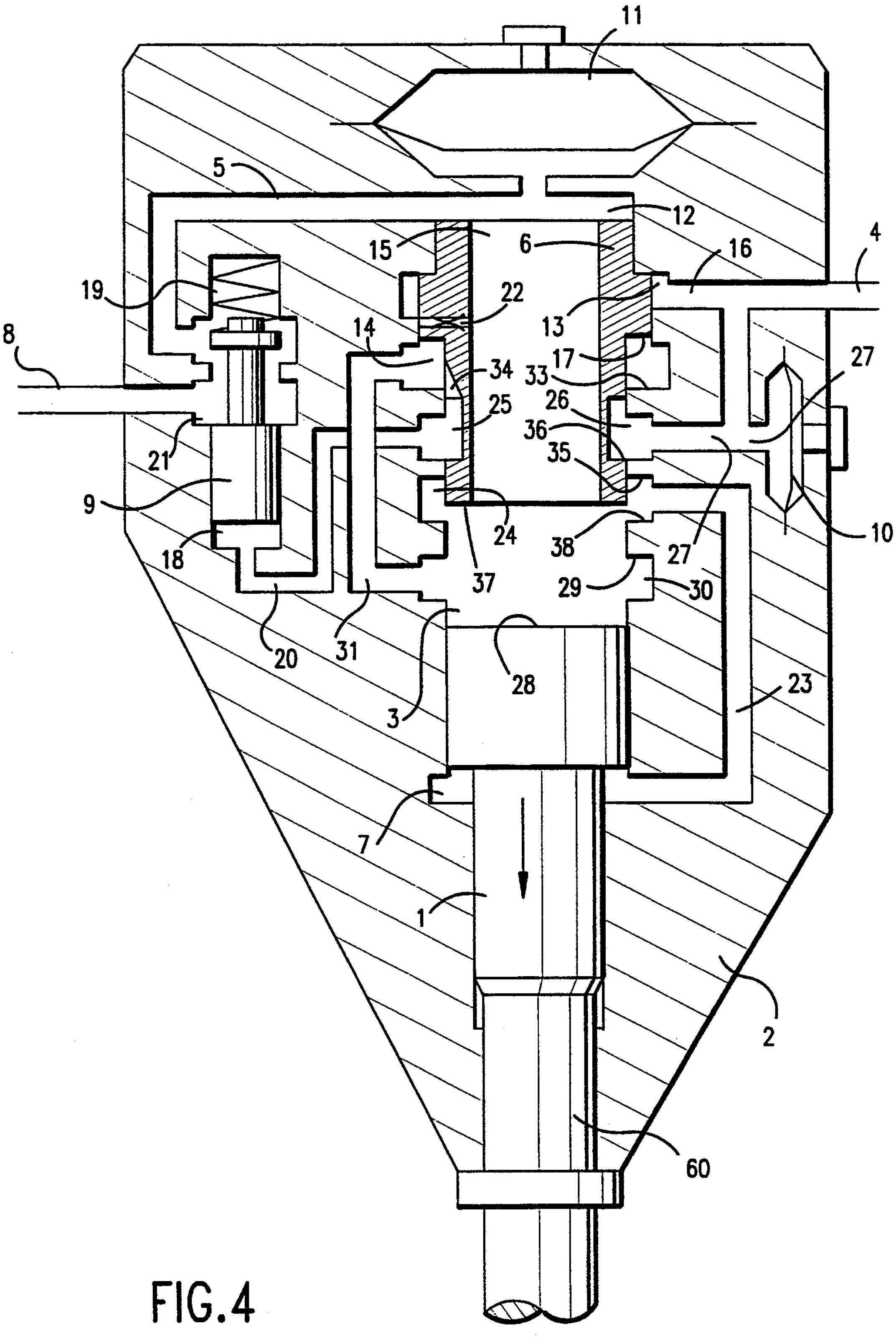

The areas of the sections of the chambers 3, 12, 13, 14 are so selected that when the control chamber 14 is connected to the high pressure supplying the apparatus, the distributor 6 assumes the position shown in FIG. 4 and then brings the medium pressure circuit, consisting of the accumulator 11, the chambers 12 and 3, and the channels 5 and 15, into communication with the chamber 7, so as to accelerate the piston in its striking stroke. Conversely, when the control chamber 14 of the distributor is subjected to the medium pressure, the distributor 6 assumes the position shown in FIG. 2 and connects the chamber 7 to the high pressure circuit, thus enabling the striking piston 1 to move upwards again.

As a non-limitative example, and in the remainder of the description, it is accepted that the distributor 6 makes a downward movement when the control chamber 14 is connected to the medium pressure circuit, and an upward movement when said chamber is in communication with the supply circuit 4.

The medium pressure regulation slide valve 9, together with its working cylinder, delimits two antagonistic chambers 18 and 19, the first being continuously connected to the high pressure supply circuit by the channel 20. In a variant of the apparatus (FIG. 13), the first antagonistic chamber 18 is connected to the chamber 7. The other chamber 19, which contains a spring, is continuously or discontinuously connected to the medium pressure circuit by the channel 5. The regulating slide valve 9 also comprises in its central part a groove 21 continuously connected to the return circuit 8, which, depending on the position of the slide valve, makes it possible to create a constriction between the medium pressure circuit and the return circuit 8.

In the forms of construction illustrated in FIGS. 2 to 10 a hydropneumatic accumulator 10 of small volume is continuously connected to the high pressure circuit 4 in order to damp the fluctuations of pressure at the inlet of the apparatus and thus to spare the hydraulic supply pumps.

The invention relates to a hydraulic device capable of bringing about the regular reciprocating sliding of a stepped striking piston in a cylinder having two concentric bearing surfaces. The distribution system is in addition so arranged as to make its operation independent of the pressure of the return circuit of the apparatus.

Figure 2:
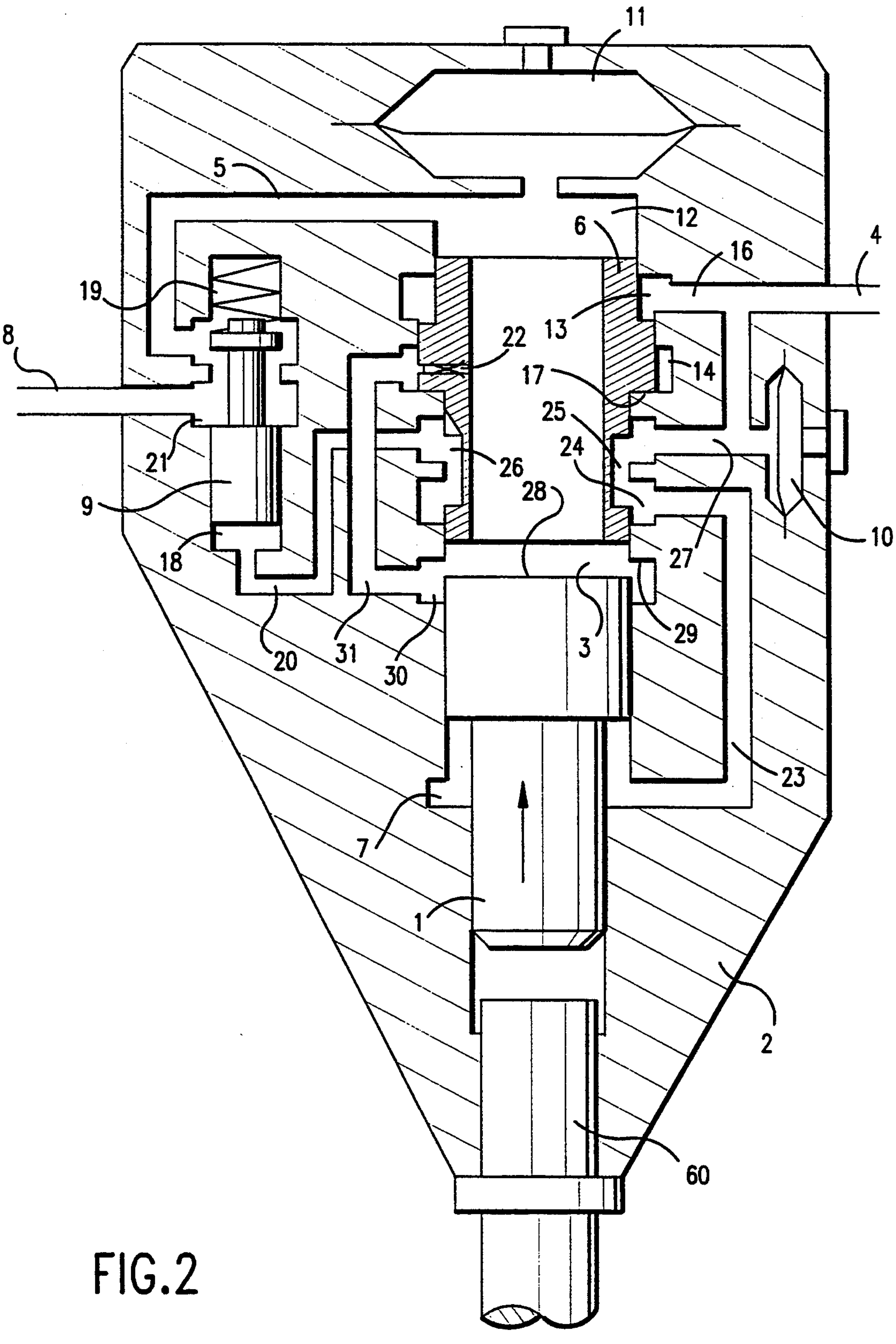
FIGS. 2 to 4 are three views in longitudinal section of an apparatus equipped with a first movable assembly comprising a striking piston, a distributor, a pressure regulating slide valve.

This device functions as follows:

FIG. 2 shows the position of the distributor 6 when the piston 1 moves upwards.

At that moment the control chamber 14 is connected to the medium pressure circuit by a calibrated orifice 22 leading into a duct 31 in communication with the driving chamber 3.

At that instant the distributor 6 brings the upward movement chamber 7 into communication with the high pressure circuit 4 by way of the channel 23, the groove 24 formed in the body of the apparatus, the groove 25 formed in the body of the distributor, the groove 26 formed in the body of the apparatus, and finally the channel 27, thus permitting the upward stroke of the piston 1.

In the course of its upward movement the top edge 28 of the piston, which delimits one end of the chamber 3, crosses the top edge 29 of a groove 30 formed in the body of the apparatus. This last-mentioned groove is continuously connected to the chamber 14 by the channel 31.

Figure 3:
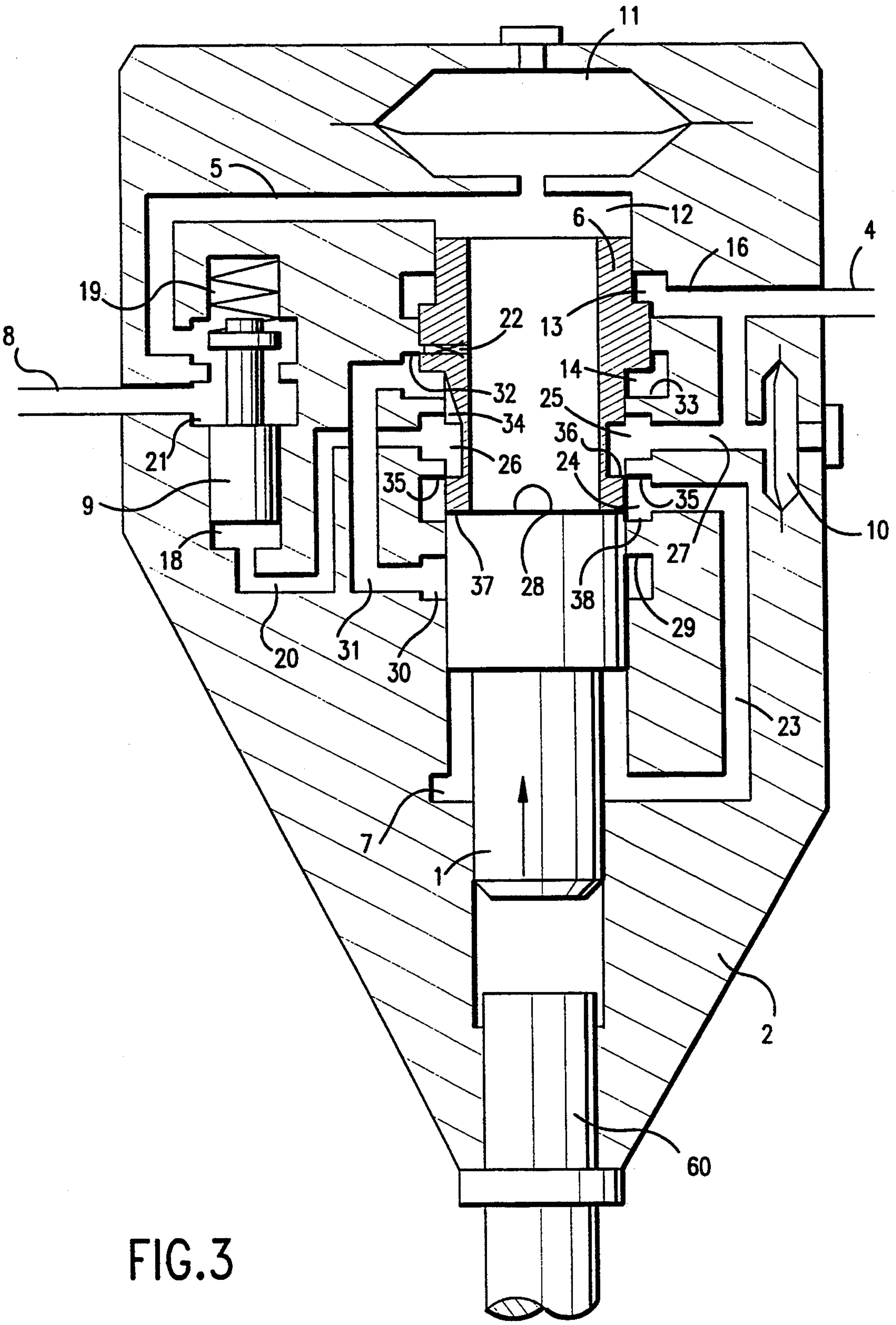

When the piston 1 reaches the distributor 6 in the course of its upward movement, it drives the latter in its stroke, as shown in FIG. 3.

In the course of the movement of the distributor, in succession:

- The top edge 32 of the control chamber 14 closes the calibrated orifice 22 of the distributor 6, and at the same time the edge 33 of the control chamber 14 uncovers the calibrated passage 34, permitting the controlled supply of pressurized fluid to the chamber 14 from the groove 26 connected to the channel 27.
- The top edge 35 of the groove 24 crosses the edge 36 of the groove 25 of the distributor 6, and the connection between the high pressure circuit 4 and the upward movement chamber 7 is then closed. The striking piston 1 slows down its stroke and moves away from the distributor 6.
- The bottom edge 37 of the distributor, which delimits one end of the chamber 3, crosses the bottom edge 38 of the groove 24. From that moment on, the upward movement chamber 7 is brought into communication with the medium pressure circuit by way of the channel 3, the groove 24, and the chamber 3. The resultant of the forces applied to the striking piston is reversed, and the latter starts its accelerated striking stroke. The distributor 6 continues its upward movement at reduced speed, depending on the quantity of pressurized fluid which can circulate through the calibrated passage 34.

In the course of the downward movement of the striking piston, as illustrated in FIG. 4, the top edge 28 of said piston uncovers the edge 29 of the groove 30 formed in the body of the apparatus and then by way of a channel 31 brings the control chamber 14 into communication with the medium pressure circuit through the intermediary of the chamber 3.

The quantity of pressurized fluid able to circulate through the calibrated passage 34 is then insufficient to create the pressure necessary for the equilibrium of the distributor 6. The resultant of the forces applied to the distributor 6 is reversed, and the latter starts its downward stroke.

Shortly after the impact of the piston 1 on the tool 60, and while the distributor 6 is moving downwards, in succession:

The edge 37 of the distributor 6 crosses the bottom edge 38 of the groove 24 and thus blocks the connection between the chamber 7 and the medium pressure circuit.

The edge 36 of the groove 25 of the distributor 6 uncovers the top edge 35 of the groove 24: a connection is then made between high pressure circuit 4 and upward movement chamber 7 by means of the circuit 27, 26, 25, 24 and 23. The resultant of the forces applied to the striking piston 1 is reversed and the latter starts its upward stroke.

The edge 33 defining one end of the chamber 14 blocks the end of the calibrated passage 34, and at the same time the edge 32 delimiting the other end of the groove 14 uncovers the calibrated orifice 22. The distributor 6 ends its downward stroke, the fluid displaced into the chamber 14 being able to be discharged either through the channel 31 and the groove 30 or through the calibrated orifice 22.

The operating cycle continues as previously described.

Figure 5:
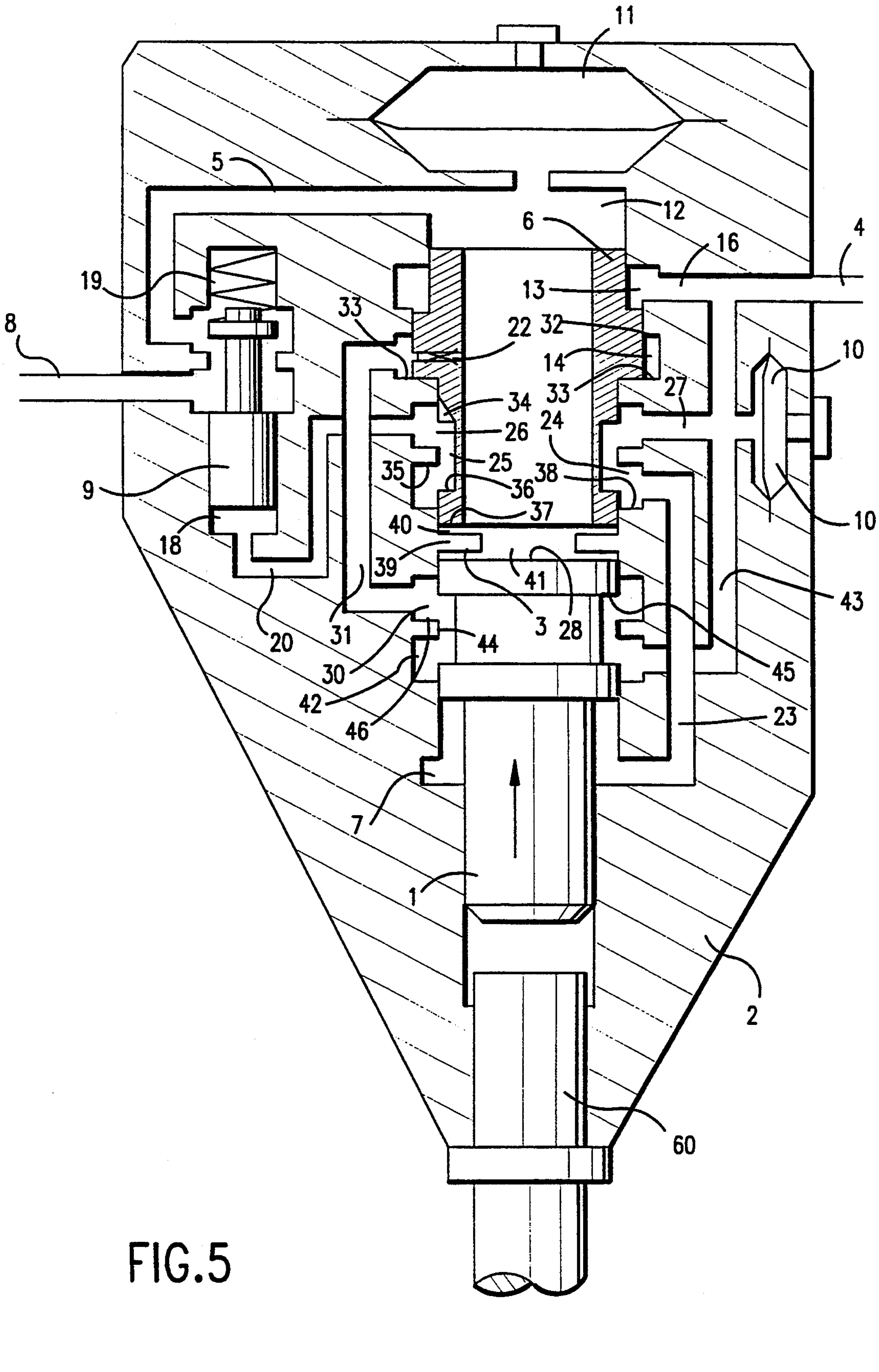
FIGS. 5 and 6 are two views in longitudinal section of a variant of the apparatus shown in FIGS. 1 to 3.

FIG. 5 illustrates a variant of the hydraulic device shown in FIGS. 2 to 4, in which variant the bore formed in the body of the apparatus is divided by an annular wall 39 into two parts containing respectively the piston 1 and the distributor 6. In this case the end 37 of the distributor and the part 39 of the body of the apparatus delimit a chamber 40, the end 28 of the striking piston and the part 39 of the body of the apparatus delimit the driving chamber 3, the two chambers 3 and 40 being connected by a wide channel 41. A groove 42 formed in the body of the apparatus is continuously connected to the supply pressure by a channel 43. A groove 44 is formed in the striking piston 1; its purpose is to permit a connection between the groove 30 and the groove 42.

The operation of the apparatus is as follows:

FIG. 5 shows the position of the distributor 6 when the striking piston 1 is moving upwards.

The control chamber 14 is connected to the medium pressure circuit by the calibrated orifice 22.

The groove 25 of the distributor 6 brings the high pressure circuit 4 into communication with the upward movement chamber 7 by way of the circuit 27, 26, 25, 24 and 23, thus permitting the upward movement of the piston 1.

As soon as the edge 45 of the groove 44 formed in the body of the piston 1 uncovers the edge 46 delimiting the bottom end of the groove 30, the control chamber 14 is then connected to the high pressure circuit by a channel 31. The quantity of pressurized oil able to circulate through the calibrated orifice 22 is then insufficient to maintain the equilibrium pressure of the distributor. The resultant of the forces applied to the distributor is reversed, and the latter starts its upward movement.

In the course of its movement, in succession:

The edge 32 of the control chamber 14 blocks the calibrated orifice 22, and at the same time the edge 33 of the same chamber 14 uncovers the calibrated passage 34.

The edge 35 of the groove 24 crosses the edge 36 of the groove 25 of the distributor 6, and the connection between high pressure circuit 4 and upward movement chamber 7 is then blocked.

The edge 37 at the end of the distributor 6 uncovers the edge 38 of the groove 24. From that moment on, the upward movement chamber 7 is brought into communication with the medium pressure circuit 40, 41, 3 by way of the groove 24 and the channel 23. The resultant of the forces applied to the striking piston is reversed and the latter starts its accelerated striking stroke.

In the course of its downward movement the edge 45 of the groove 44 crosses the edge 46 of the groove 30 and thus blocks the direct connection between the high pressure circuit 4, 43, 42, 44 and the control circuit 30, 31, 14. The distributor 6 continues its upward movement at reduced speed, in dependence on the quantity of pressurized fluid able to circulate through the calibrated passage 34.

Figure 6:
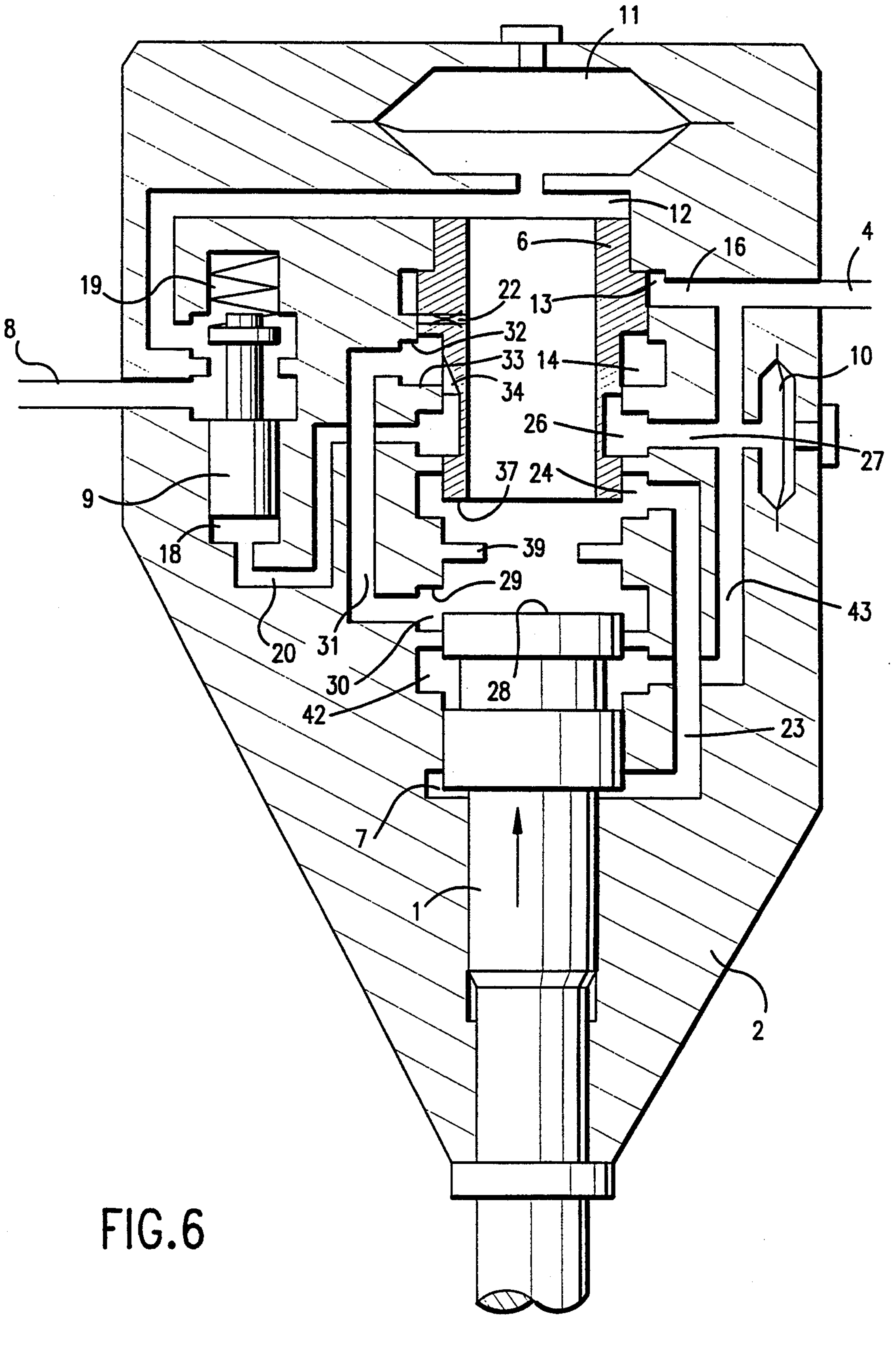

The top edge 28 of the striking piston then uncovers the edge 29 of the groove 30 (as shown in FIG. 6) and the operating cycle then becomes identical to that described for FIGS. 3 and 4.

Figure 7:
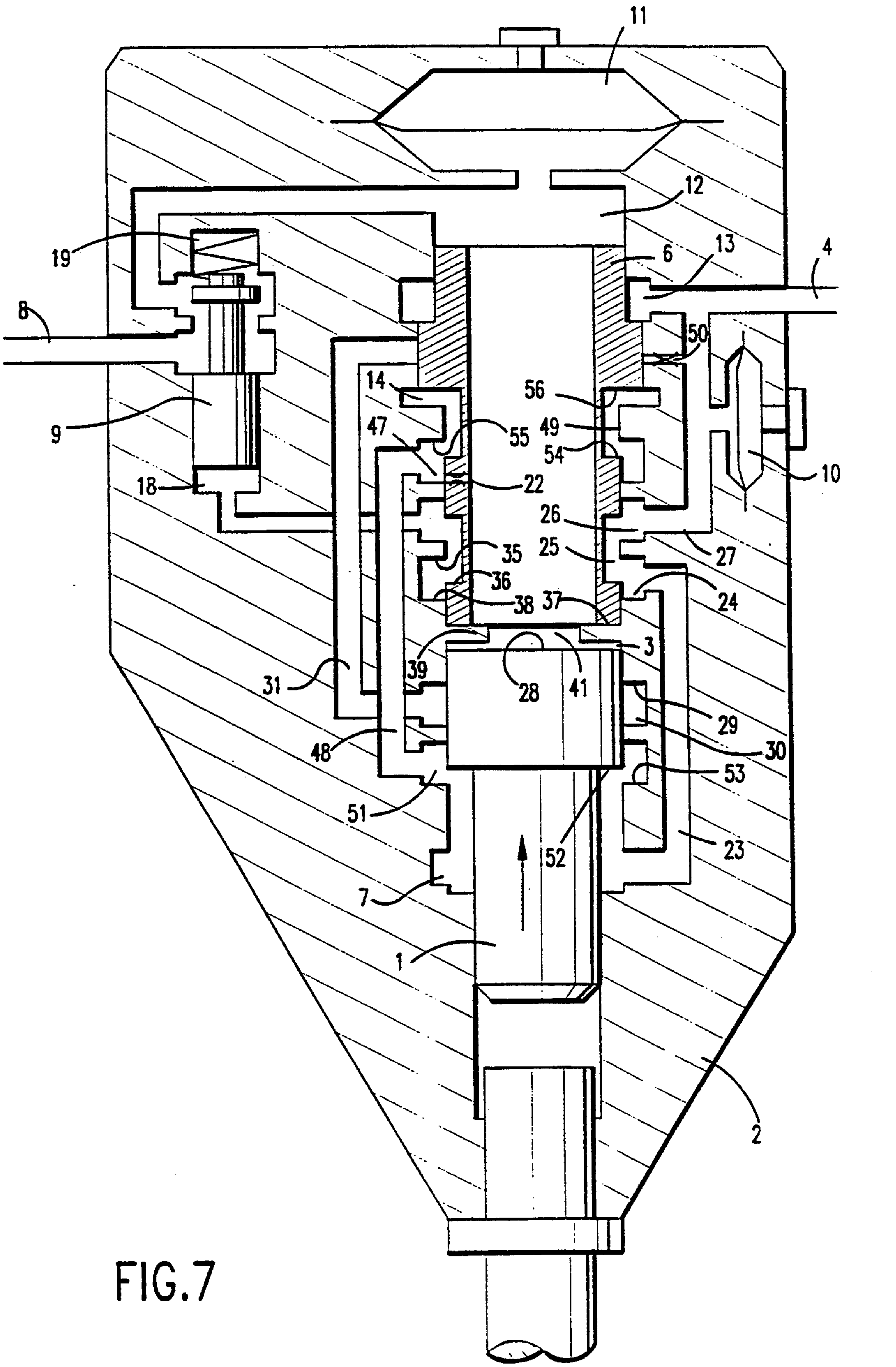
FIGS. 7 and 8 are two views in longitudinal section of a variant of the apparatus shown in FIGS. 1 to 3.

FIG. 7 illustrates a variant of the hydraulic device described with reference to the preceding figures. As in the device described for FIGS. 5 and 6, the chambers 40 and 3 are separate and connected by a wide channel 41. A groove 51 formed in the body of the apparatus and leading into the top bearing surface of the striking piston is continuously connected to a groove 47 formed in the body of the apparatus and leading into the bottom bearing surface of the distributor by way of a channel 48.

A groove 49 formed in the body of the distributor 6 makes it possible to bring the control chamber 14 and the groove 47 into communication with one another in dependence on the position of the distributor.

Finally, the channel 31 no longer leads directly into the control chamber 14, but into the intermediate bearing surface of the distributor 6.

A calibrated orifice 50 is formed in the body of the apparatus, one of its ends being continuously in communication with the high pressure circuit 4; it serves the same purpose as the calibrated orifice 34 described for the preceding figures.

The operation of the apparatus is as follows:

FIG. 7 shows the position of the distributor 6 when the striking piston 1 is moving upwards.

The control chamber 14 is connected to the medium pressure circuit by means of the groove 49 and the calibrated orifice 22.

The groove 25 of the distributor 6 brings the high pressure circuit 4 into communication with the upward movement chamber 7 by way of the circuit 27, 26, 25, 24 and 23, thus permitting the upward movement of the piston 1.

As soon as the edge 52 of the striking piston 1, which delimits one end of the annular chamber 7, uncovers the edge 53 delimiting the bottom end of the groove 51, the control chamber 14 is then connected to the high pressure circuit 4 by means of the circuit 4, 27, 26, 25, 24, 23, 7, 51, 48, 47, 49. The amount of pressurized oil able to circulate through the calibrated orifice 22 is then insufficient to maintain the equilibrium pressure of the distributor. The resultant of the forces applied to the distributor is reversed and the latter starts its upward movement.

In the course of its movement, in succession:

The bottom edge 54 delimiting one end of the groove 49 crosses the edge 55 delimiting the top end of the groove 47, and at the same time the other end 56 of the groove 49 uncovers the channel 31 and the calibrated orifice 50, thus permitting the regulated supply of pressurized fluid to the control chamber 14. (The groove 30 and the channel 31 are at this moment of the cycle blocked by the striking piston 1).

The edge 35 of the groove 24 crosses the edge 36 of the groove 25 of the distributor 6, and the connection between high pressure circuit 4 and upward movement chamber 7 is then blocked.

The edge 37 delimiting the bottom end of the distributor 6 uncovers the edge 38 of the groove 24. From that moment on, the upward movement chamber 7 is brought into communication with the medium pressure circuit 40, 41, 3 by way of the groove 24 and the channel 23. The resultant of the forces applied to the striking piston is reversed and the latter starts its accelerated striking stroke. The distributor 6 ends its upward movement.

In the course of its downward movement the edge 52 of the piston 1 crosses the edge 53 and thus blocks the connection between the upward movement chamber 7 and the groove 47.

Figure 8:
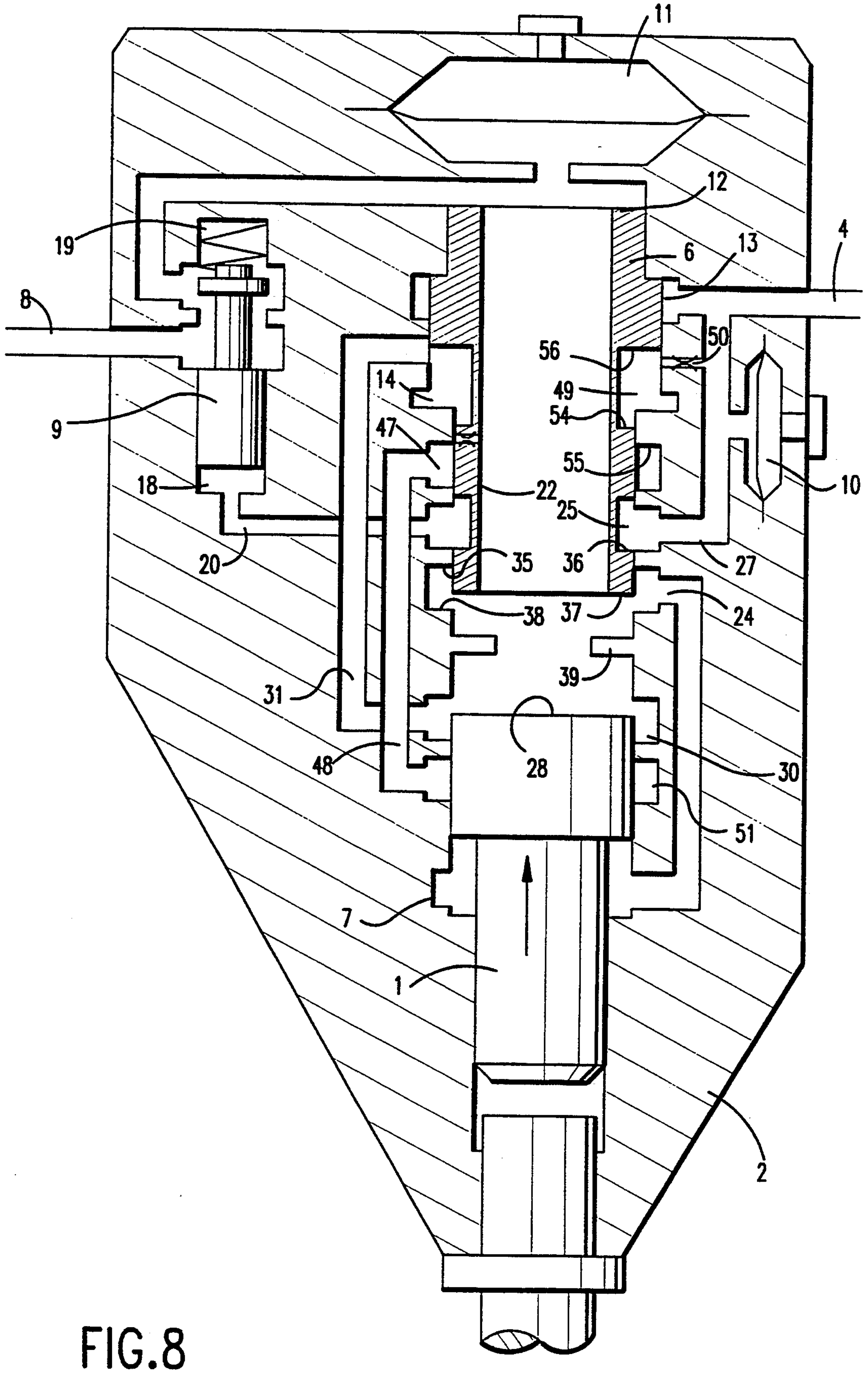

The top edge 28 of the striking piston then uncovers the edge 29 of the groove 30 (as shown in FIG. 8). The control chamber 14 is then connected to the medium pressure circuit by a wide channel 31. The amount of pressurized fluid able to circulate through the calibrated orifice 50 is then insufficient to ensure hydraulic equilibrium of the distributor and the latter starts its downward movement.

In the course of the downward movement of the distributor 6 the edge 54 of the groove 49 uncovers the edge 55 of the groove 47, and at the same time the other edge 56 of the groove 49 blocks the calibrated orifice 50 and the channel 31, the channel 48 and the groove 51 being blocked by the striking piston, and the fluid contained in the control chamber 14 will then be discharged through the calibrated orifice 22 to the medium pressure circuit. The speed of downward movement of the distributor is then regulated.

Starting from that moment, the end of the operating cycle becomes identical to that described with reference to FIGS. 2 and 3.

Figure 9:
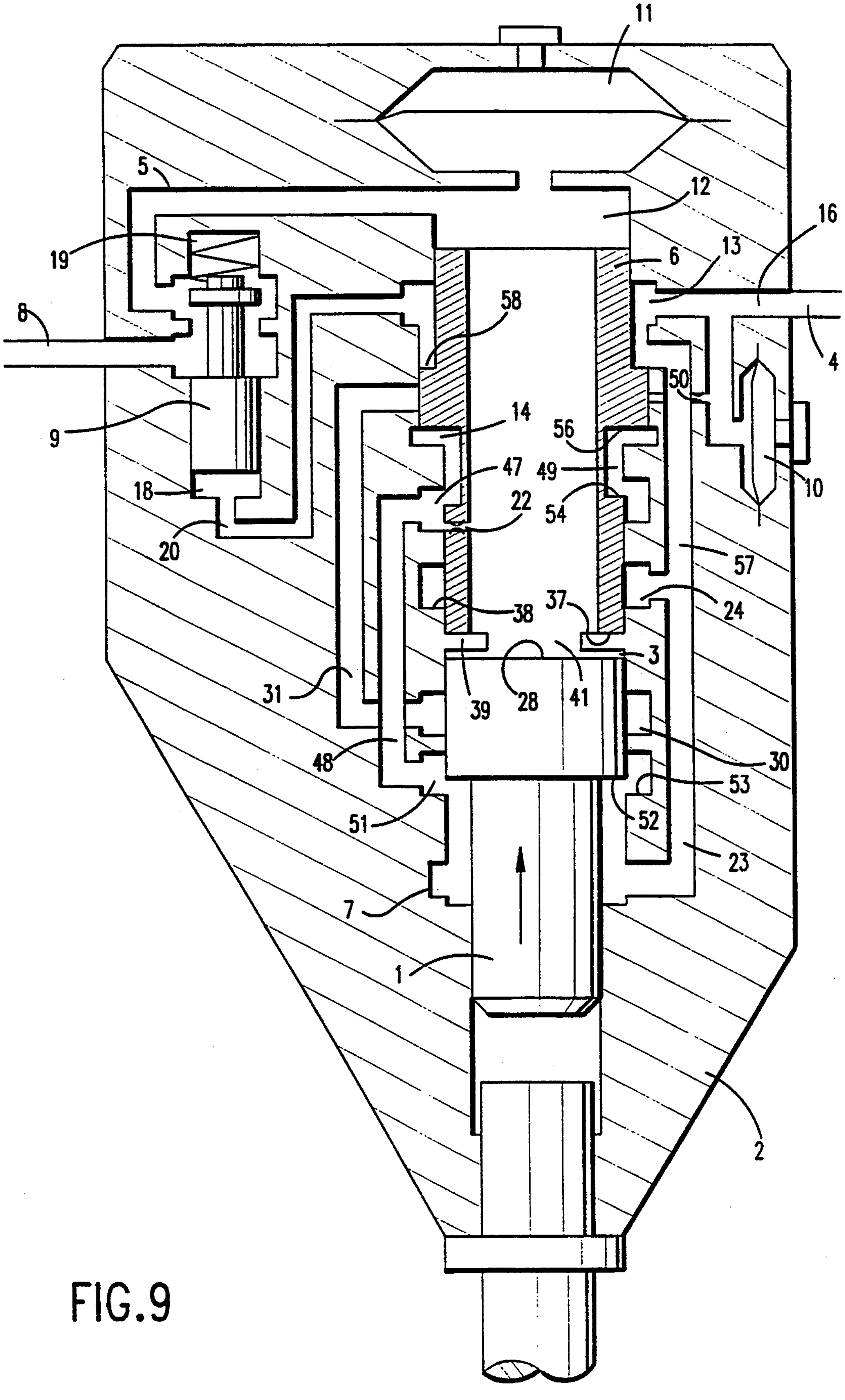
FIGS. 9, 10 and 13 are views in longitudinal section of a variant of the apparatus shown in FIGS. 7 and 8.

FIG. 9 illustrates a variant of the hydraulic device described in connection with FIGS. 7 and 8. In this configuration the groove 26 formed in the body of the apparatus and continuously connected to the high pressure circuit 4 no longer exists, and this is also true of the groove 25 formed in the body of the distributor 6. All the other circuits remain identical to those in FIGS. 7 and 8 with the exception of the channel 23, which is extended by a channel 57 which leads into the bearing surface of the distributor which has the largest section.

The operation of the apparatus is as follows:

FIG. 9 shows the position of the distributor 6 when the striking piston 1 is moving upwards.

The control chamber 14 is connected to the medium pressure circuit by way of the groove 49 and the calibrated orifice 22.

The edge 58 delimiting one end of the chamber 13 uncovers the channel 57 and thus brings the high pressure circuit 4 into communication with the upward movement chamber 7 by way of the circuit 16, 13, 57 and 23, thus permitting the upward movement of the piston 1.

As soon as the edge 52 of the striking piston 1, which delimits one end of the annular chamber 7, uncovers the edge 53 delimiting the bottom end of the groove 51, the control chamber 14 is thereupon connected to the high pressure circuit 4 by way of the circuit 16, 13, 57, 23, 7, 51, 48, 47, 49. The amount of pressurized oil able to circulate through the calibrated orifice 22 is then insufficient to maintain the equilibrium pressure of the distributor. The resultant of the forces applied to the distributor 6 is reversed and the latter starts its upward movement.

In the course of its movement, in succession:

The bottom edge 54 delimiting one end of the groove 49 crosses the edge 55 delimiting the top end of the groove 47, and at the same time the other end 56 of the groove 49 uncovers the channel 31 and the calibrated orifice 50, thus permitting the regulated supply of pressurized fluid to the control chamber 14. (The groove 30 and the channel 31 are at that moment of the cycle blocked by the striking piston 1).

The edge 58 blocks the channel 57, thus interrupting the connection between high pressure circuit 4 and upward movement chamber 7.

The edge 37 delimiting the bottom end of the distributor 6 uncovers the edge 38 of the groove 24. From that moment onwards, the upward movement chamber 7 is brought into communication with the medium pressure circuit 40, 41, 3 by way of the groove 24 and of the channel 23. The resultant of the forces applied to the striking piston is reversed and the latter starts its accelerated striking stroke. The distributor 6 ends its upward stroke.

In the course of its downward movement the edge 52 of the piston 1 crosses the edge 53 and thus blocks the connection between the upward movement chamber 7 and the groove 47.

Figure 10:
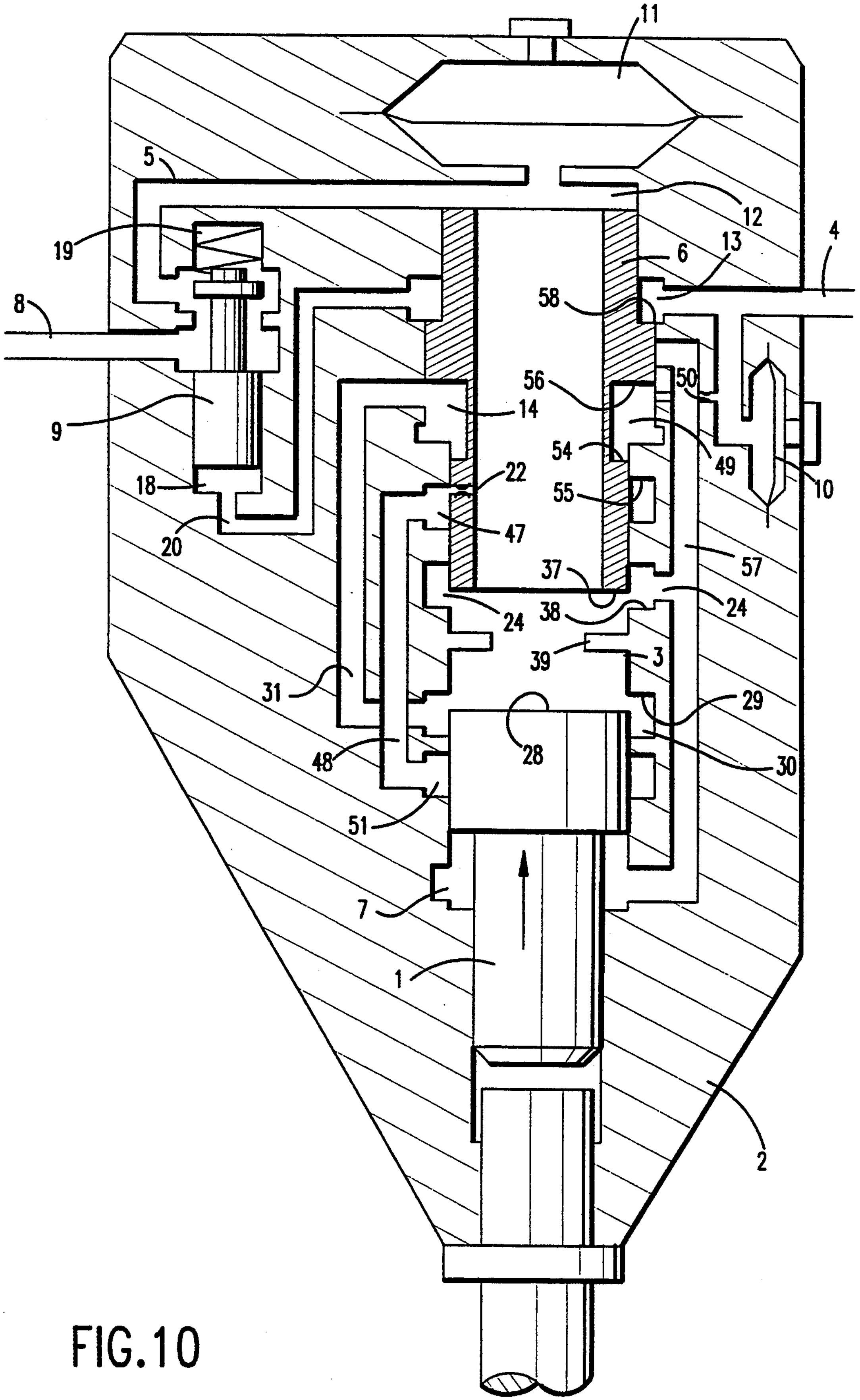

The top edge 28 of the striking piston 1 thereupon uncovers the edge 29 of the groove 30 (as shown in FIG. 10). The control chamber 14 is then connected to the medium pressure circuit by a channel 31.

The amount of pressurized fluid able to circulate through the calibrated orifice 50 is then insufficient to ensure the hydraulic equilibrium of the distributor, and the latter starts its downward stroke.

In the course of the downward movement of the distributor 6 the edge 54 of the groove 49 uncovers the edge 55 of the groove 47, and at the same time the other edge 56 of the groove 49 blocks the calibrated orifice 50 and the channel 31, the channel 48 and the groove 51 being blocked by the striking piston, and the fluid contained in the control chamber 14 will then be discharged through the calibrated orifice 22 to the medium pressure circuit. The speed of downward movement of the distributor is then regulated.

The edge 37 of the distributor 6 crosses the edge 38 of the groove 24, thus blocking the connection between upward movement chamber 7 and medium pressure circuit 3.

Shortly afterwards the edge 58 defining one end of the chamber 13 uncovers the channel 57 and thus makes a connection between high pressure circuit 4 and upward movement chamber 7. The resultant of the forces applied to the striking piston 1 is reversed and the latter starts its upward stroke.

The cycle of operation continues as previously described.

Figure 11:
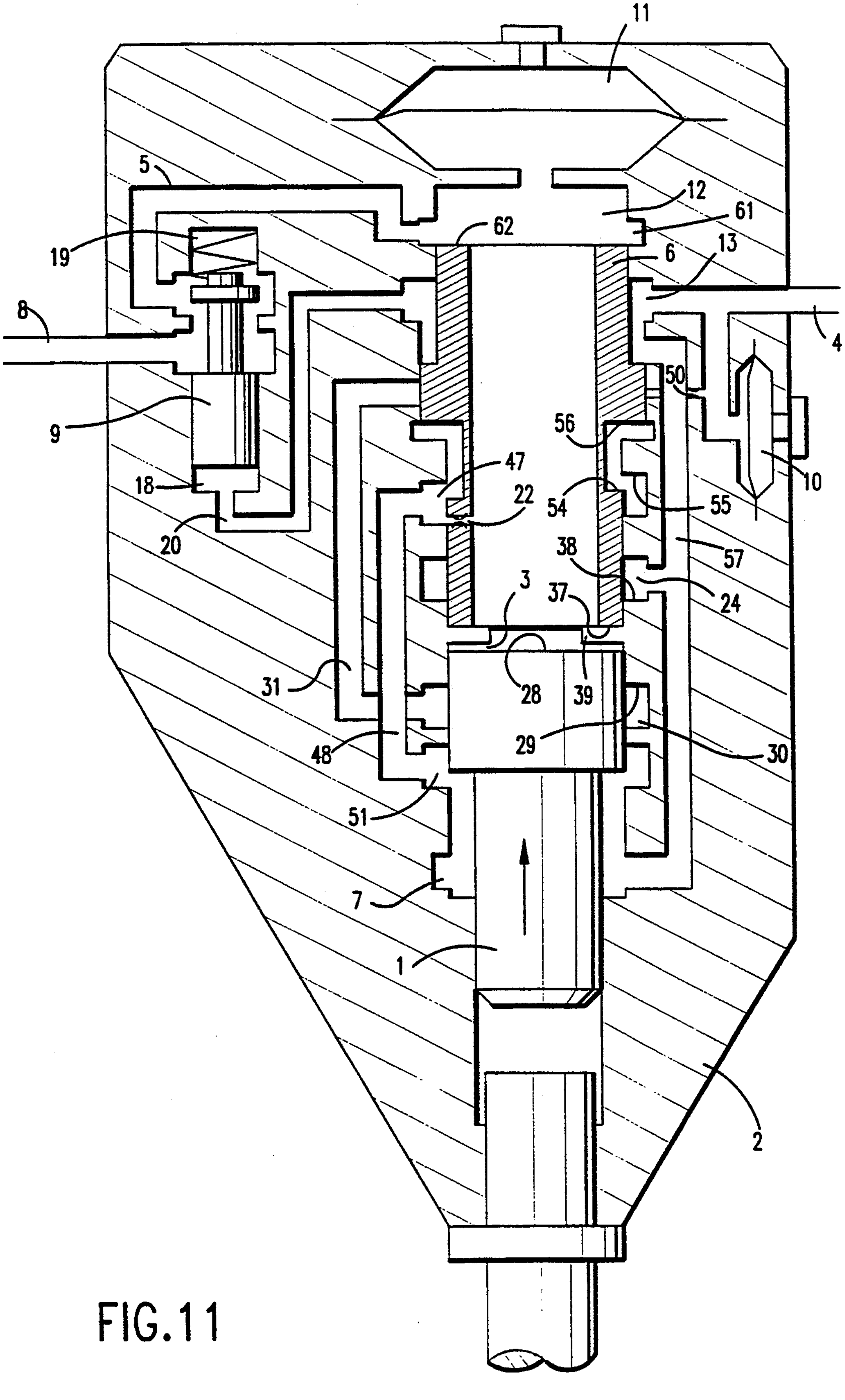
FIGS. 11 and 12 are two views in longitudinal section of a variant of the apparatus shown in FIGS. 9 and 10.
Figure 12:
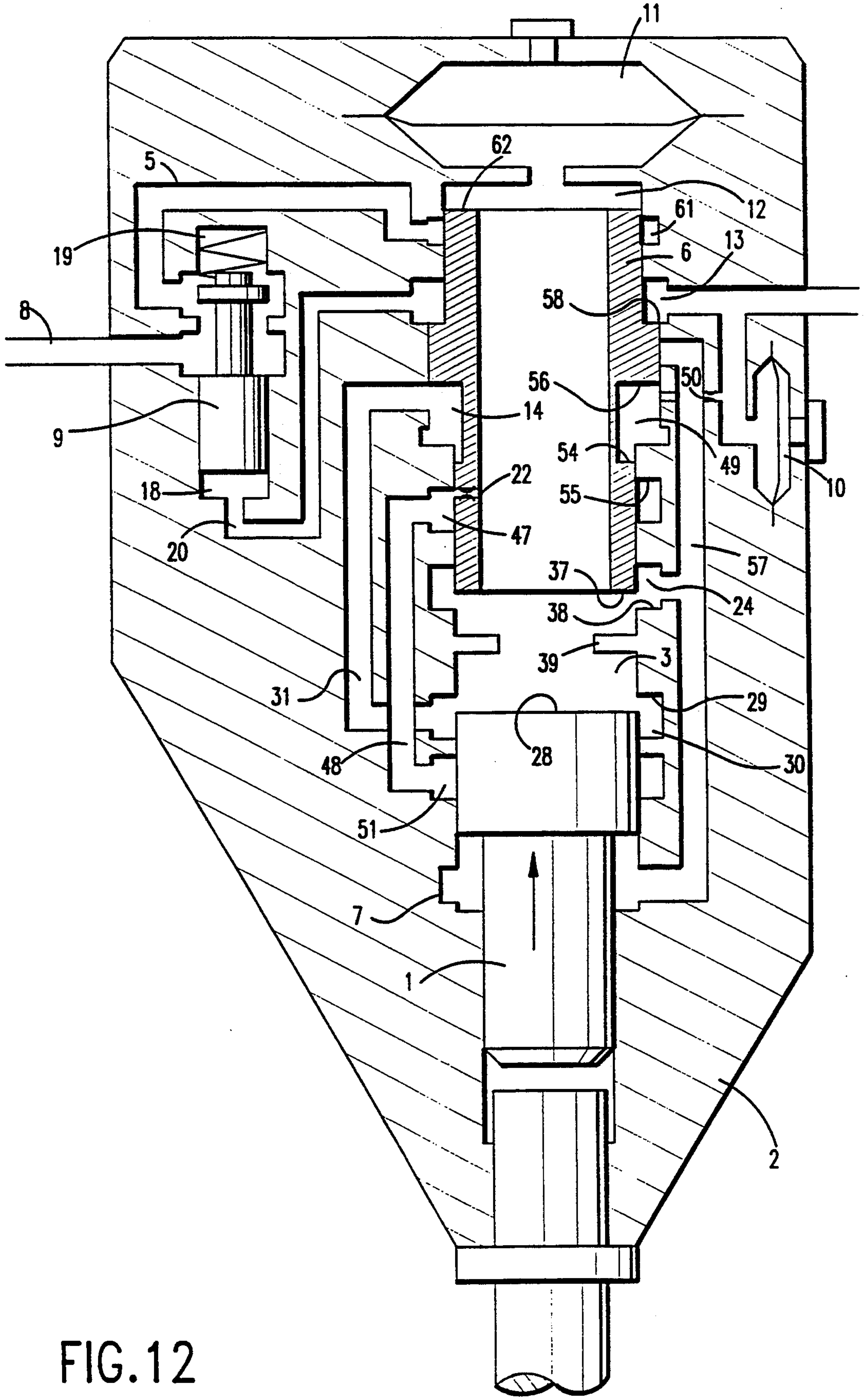
Figure 13:
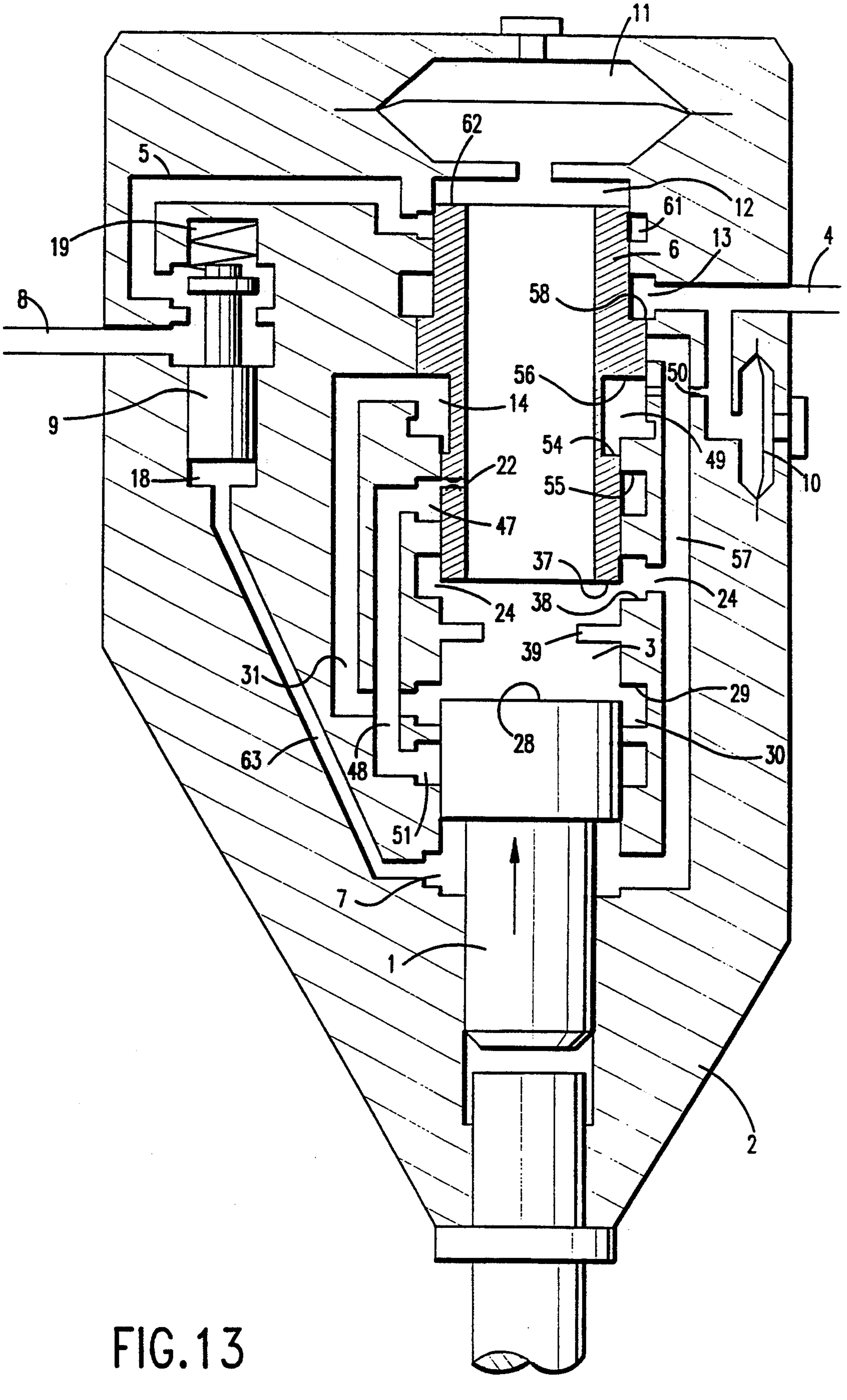

FIGS. 11 and 12 illustrate a variant of the hydraulic device described in connection with FIGS. 9 and 10. In this configuration the channel 5 is no longer continuously connected to the chamber 12 but to a groove 61 formed in the body of the apparatus. This groove 61 is so positioned that the edge 62 of the distributor 6 which delimits one end of the chamber 12 uncovers it on the downward movement of the distributor and blocks it on its upward movement. Thus the circulation of oil through the channel 5 to the return circuit is now effected only on the upward movement of the striking piston 1 (distributor 6 in the low position), while on the downward movement of the piston 1 (distributor 6 in the high position) the amount of pressurized oil given up by the accumulator 11 is entirely transferred to the driving chamber 3, the total efficiency of the apparatus thus being improved.

I claim:

1. A percussion apparatus comprising a striking piston driven hydraulically in a reciprocating fashion by an incompressible fluid inside a cylinder and striking against a tool, wherein the striking piston slides in cylinder having two concentric piston bearing surfaces of different cross sections, of which that situated on the tool side has a cross section smaller than that remote from the tool, the piston and the cylinder delimiting two antagonistic chambers including an annular bottom chamber and a top chamber having a larger cross section than said bottom chamber, wherein:

the interior of the top chamber is permanently at a regulated pressure of a value intermediate between an internal inlet high pressure and an outlet low pressure, and the annular bottom chamber is alternately connected by a distributor to an external high pressure supply circuit during an upward phase of the piston and to the top chamber during an accelerated downward phase of the piston.

2. The percussion apparatus as claimed in claim 1, further comprising an intermediate pressure regulation means that includes an energy accumulator and a pressure regulator comprising a regulator cylinder inside which is mounted a pressure regulator piston forming a slide valve, one end of the pressure regulator piston communicating with a first chamber connectable to the high pressure circuit, and the other end of the pressure regulator piston being situated in a second chamber connectable to an intermediate pressure circuit and containing a spring tending to displace the slide valve towards the one end, the slide valve being connected to a low pressure return circuit, said slide valve forming a constriction between the intermediate pressure circuit and the low pressure return circuit when located in a first position.

3. The percussion apparatus as claimed in claim 2, wherein the first chamber of the pressure regulator is in communication with an annular chamber formed in the cylinder in which the striking piston moves, said annular chamber being permanently connected to the high pressure supply circuit.

4. The percussion apparatus as claimed in claim 2, wherein the pressure regulator first chamber is in communication with the annular bottom chamber, which in turn is connected to the high pressure supply circuit during the upward phase of the striking piston.

5. The percussion apparatus as claimed in claim 2, wherein the top chamber is connected to the pressure regulator by a channel leading into a groove formed in the cylinder of the apparatus in a zone covered by the distributor in a period of downward movement of the striking piston, and uncovered during a period of upward movement of the striking piston.

6. The percussion apparatus as claimed in claim 1, wherein the movement of the striking piston is controlled by the distributor, the distributor further comprising a hydraulic distributor mounted slidably in the cylinder, and defining with the cylinder four separate chambers including said top chamber, which is situated at a lower end of said distributor, an upper chamber situated at an upper end of the distributor, said top and upper chambers being connected by a wide channel and in permanent communication with an intermediate pressure circuit, a first annular chamber continuously connected to the high pressure supply circuit having a first area and a second annular chamber which is antagonistic to said first annular chamber has a second area larger than the first area of the first annular chamber, and is connected alternately to the high pressure circuit and to the intermediate pressure circuit in dependence on the position of the striking piston.

7. The percussion apparatus as claimed in claim 6, wherein the distributor is annular and comprises a wide central channel bringing into communication the top and upper chambers disposed at its ends.

8. The percussion apparatus as claimed in claim 7, wherein the distributor is disposed coaxially above the striking piston in the cylinder.

9. The percussion apparatus as claimed in claim 8, wherein the distributor includes an annular groove which, in one position of the distributor, communicates with grooves formed in the cylinder that are connected to the high pressure supply circuit and to the annular bottom chamber.

10. The percussion apparatus as claimed in claim 7, wherein the cylinder in which the striking piston and the distributor are mounted is divided into two compartments by an annular wall.

11. The percussion apparatus as claimed in claim 1, wherein the high pressure supply circuit is equipped with a hydropneumatic accumulator of small volume, which is intended to damp pressure fluctuations at the inlet of the apparatus.

* * * * *